United States Patent [19]

Nakauchi et al.

[11] Patent Number: 4,751,018

[45] Date of Patent: Jun. 14, 1988

[54] ALPHA-METHYLCINNAMIC ACID ESTER DERIVATIVE AND LIQUID CRYSTAL COMPOSITION

[75] Inventors: Jun Nakauchi; Yoshitaka Kageyama, both of Tokyo; Mioko Uematsu, Kawasaki; Yoshihiro Sako, Yokohama; Shunsuke Minami, Kawasaki, all of Japan

[73] Assignee: Mitsubishi Rayon Company Ltd., Tokyo, Japan

[21] Appl. No.: 24,005

[22] Filed: Mar. 10, 1987

[30] Foreign Application Priority Data

| | | | |
|---|---|---|---|
| Mar. 11, 1986 | [JP] | Japan | 61-53216 |
| Mar. 31, 1986 | [JP] | Japan | 61-73355 |
| Aug. 12, 1986 | [JP] | Japan | 61-189427 |
| Aug. 12, 1986 | [JP] | Japan | 61-189428 |
| Nov. 27, 1986 | [JP] | Japan | 61-282988 |

[51] Int. Cl.$^4$ ............ G02F 1/13; C09K 19/20; C09K 19/12; C07C 69/76
[52] U.S. Cl. ............ 252/299.64; 252/299.01; 252/299.5; 252/299.65; 252/299.67; 350/350 R; 350/350.5; 360/55; 360/59; 360/60; 360/73
[58] Field of Search ............ 252/299.64, 299.65, 252/299.67, 299.01, 299.5; 350/350 R, 350 S; 560/55, 59, 60, 73

[56] References Cited

U.S. PATENT DOCUMENTS

| | | | |
|---|---|---|---|
| 4,576,732 | 2/1986 | Isogai et al. | 252/299.67 |
| 4,596,667 | 6/1986 | Inukai et al. | 252/299.67 |
| 4,613,209 | 9/1986 | Goodby et al. | 252/299.65 |
| 4,615,586 | 10/1986 | Geary et al. | 252/299.64 |

FOREIGN PATENT DOCUMENTS 60-168781  9/1985  Japan .............................. 252/299.68

OTHER PUBLICATIONS

Demus, D., et al., Flussige-Kristalle in Tabellen II, Veb Deutscher Verlag fur Grumastoffinoustrie, Leipzig, pp. 234–236 (1984).
Goodby, J. W., et al., Liquid Crystals and Ordered Fluids, vol. 4, Griffin, A., et al., ed., pp. 1–32, Plenum Press, NY (1985).
Goodby, J. W., et al., J. Am. Chem. Soc., vol. 108, pp. 4729–4735 (Aug. 6, 1986).
Goodby, J. W., et al., J. Am. Chem. Soc., vol. 108, pp. 4736–4742 (Aug. 6, 1986).

*Primary Examiner*—Teddy S. Gron
*Attorney, Agent, or Firm*—Oblon, Fisher, Spivak, McClelland & Maier

[57] ABSTRACT

Disclosed is an α-methylcinnamic acid ester derivative represented by the formula:

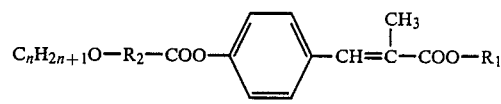

wherein n is an integer of from 5 to 18, $R_1$ represents an optically active group of the formula

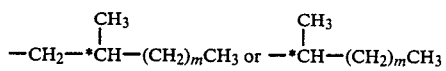

in which m is an integer of from 1 to 5 and *C represents an asymmetric carbon atom, and $R_2$ represents

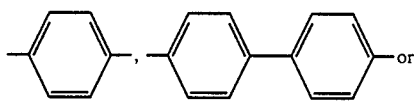

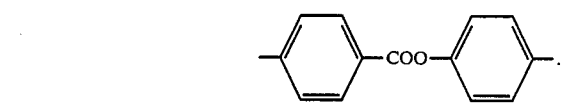

The α-methylcinnamic acid ester derivative is valuable as a ferroelectric liquid crystal or an additive to a ferroelectric liquid crystal.

3 Claims, 5 Drawing Sheets

ALPHA-METHYLCINNAMIC ACID ESTER DERIVATIVE AND LIQUID CRYSTAL COMPOSITION

BACKGROUND OF THE INVENTION (1) Field of the Invention

The present invention relates to a novel α-methylcinnamic acid ester derivative, which is valuable as a ferroelectric liquid crystal or an additive to a ferroelectric liquid crystal. Moreover, the present invention relates to a ferroelectric liquid crystal composition comprising this methylcinnamic acid ester derivative.

(2) Description of the Related Art

The mesophase of the liquid crystals widely used in a light-receiving type display at the present belongs to the nematic phase. Therefore, the display is characterized in that it does not fatigue the eyes and consumes very little energy. However, this type of display has problems in that the response speed is low and the display cannot be seen from a certain angle.

A display device or printer head using a ferroelectric liquid crystal having a much higher response speed and contrast than those of a nematic liquid crystal has been investigated.

The ferroelectric liquid crystal was discovered for the first time by R. B. Meyer et al in 1975 [J. Physique, 36, L-69-71 (1975)]. This ferroelectric liquid crystal belongs to the chiral smectic C phase (hereinafter referred to as "Sm*C phase" for brevity), and a typical compound of this ferroelectric liquid crystal is p-decyloxybenzylidene-p'-amino-2-methylbutyl cinnamate (hereinafter referred to as "DOBAMBC" for brevity) represented by the following formula (2):

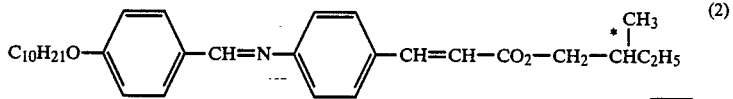

(2)

As well as DOBMBC, the ferroelectric liquid crystal materials prepared until now have an azomethine bond and a —CH=CH— group in the molecule, and thus are readily hydrolyzed and photoisomerized.

In addition to these problems, the liquid crystal with an azomethine bond in the molecule has another problem in that a good image quality of the display cannot be obtained because of undesirable coloration. Moreover, the temperature range showing ferroelectric characteristics (the temperature range where the Sm*C phase is present) is narrow, and therefore, trials have been made to expand the temperature range showing the Sm*C phase to the lower and higher temperature sides with room temperature being as the center by mixing several ferroelectric liquid crystals. However, these materials are still not satisfactory in that the temperature showing the ferroelectric characteristics (the temperature at which the Sm*C phase is present) is higher than room temperature, and therefore, a practical utilization of these materials is difficult. Accordingly, development of a ferroelectric liquid crystal having the Sm*C phase present in a practical temperature range is desired. Moreover, a ferroelectric crystal having a larger spontaneous polarization than that of the heretofore developed ferroelectric liquid crystals is desired as a liquid crystal for a printer head for which an ultra-high response speed is required.

SUMMARY OF THE INVENTION

It is therefore a primary object of the present invention to provide a novel compound which is chemically stable, does not undergo undesirable coloration, has an excellent photostability, and is valuable as a ferroelectric liquid crystal or an additive to a ferroelectric liquid crystal.

Another object of the present invention is to provide a liquid crystal composition which has an excellent stability and shows a large spontaneous polarization at practical temperatures.

More specifically, in accordance with one fundamental aspect of the present invention, there is provided an α-methylcinnamic acid ester derivative represented by the following general formula (1):

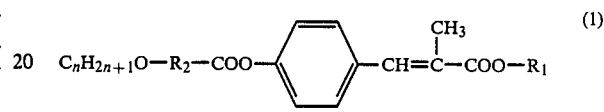

wherein n is an integer of from 5 to 18, $R_1$ represents an optically active group of the formula

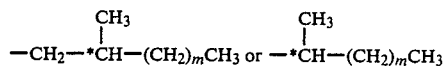

in which m is an integer of from 1 to 5 and *C represents an asymmetric carbon atom, and $R_2$ represents

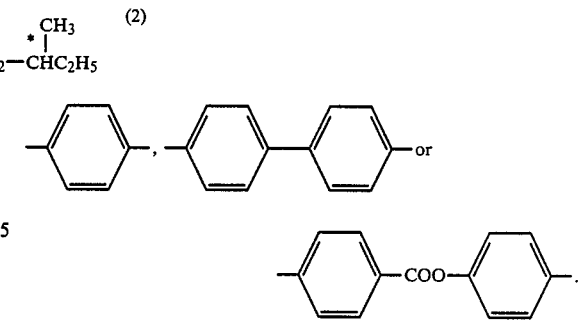

In accordance with another aspect of the present invention, there is provided a liquid crystal composition comprising an α-methylcinnamic acid ester derivative as described above.

DESCRIPTION OF THE PREFERRED EMBODIMENTS

Figure 1:
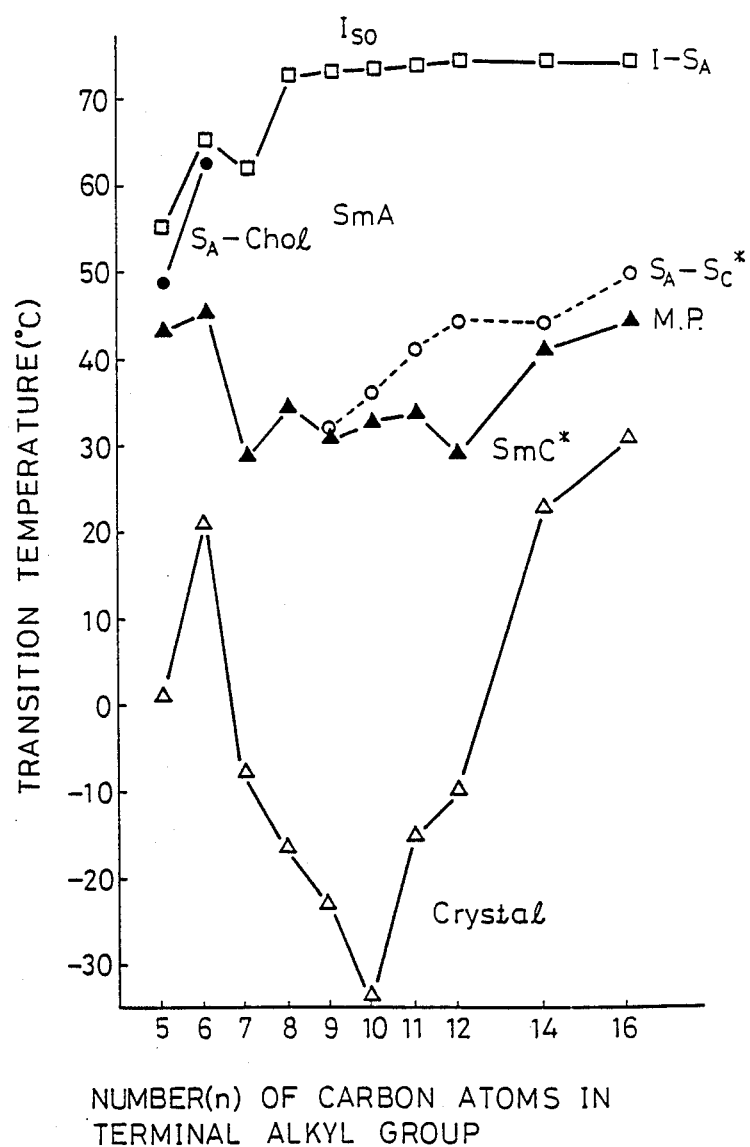
FIG. 1 is a diagram in which the phase transition temperatures of several compounds of the general formula (1), determined by differential scanning colorimetry (DSC), are plotted against the carbon number n of the terminal alkyl group.

If the carbon number of the alkyl group $C_nH_{2n+1}$ in the α-methylcinnamic acid ester derivative of the general formula (1) is 4 or less, the derivative does not show a ferroelectric liquid crystal phase and when this derivative is added to another liquid crystal having the Sm*C phase, the stability of the Sm*C phase tends to be drastically degraded.

If the carbon number of the alkyl group in the derivative is 19 or more, purification of an alkoxybenzoic acid chloride used as an intermediate material is relatively difficult and the productivity is reduced, and when the derivative is mixed with other liquid crystal, the spontaneous polarization of the liquid crystal tends to decrease.

The compound of the present invention is obtained by the following process. First, 4-hydroxybenzaldehyde is reacted with propionic anhydride in the presence of potassium propionate to form 4-hydroxy-α-methylcinnamic acid as shown below:

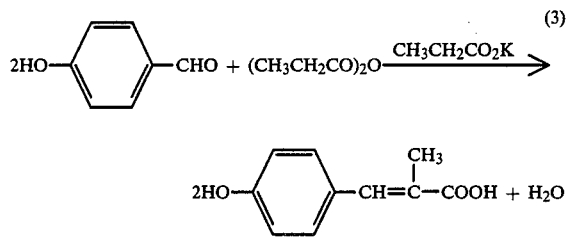

The 4-hydroxy-α-methylcinnamic acid is reacted with acetic anhydride in pyridine to form 4-acetoxy-α-methylcinnamic acid as shown below:

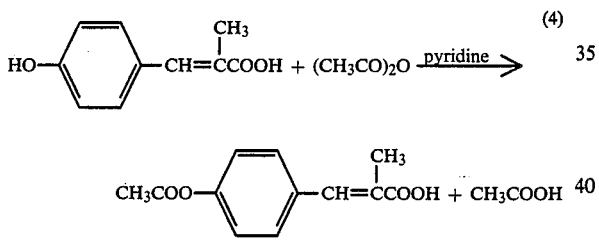

The 4-acetoxy-α-methylcinnamic acid is reacted with thionyl chloride to form 4-acetoxy-α-methylcinnamic acid chloride as shown below:

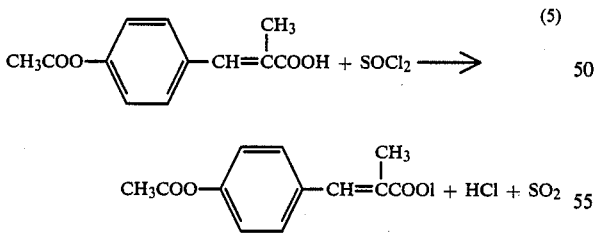

The acetoxy-α-methylcinnamic acid chloride is reacted with l- or d-2-alkanol having 4 to 8 carbon atoms (e.g., l-2-octanol) or l- or d-2-methylalkanol having 4 to 8 carbon atoms in the alkyl group (e.g., l-2-methylbutanol) (the following illustration will be made with reference to l-2-octanol and l-2-methylbutanol as typical instances, particularly the illustration of reaction formulae will be made only with reference to l-2-octanol) in the presence of triethylamine to synthesize 1-methylheptyl or 2-methylbutyl 4-acetoxy-α-methylcinnamate as shown below:

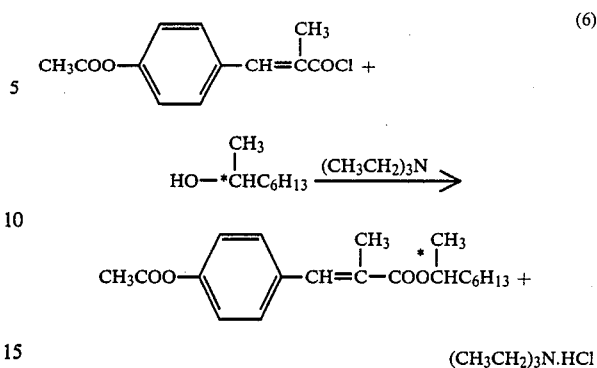

The thus-obtained ester is selectively hydrolyzed in a 50% solution of sodium carbonate in an acetone/water (1:1 by weight) mixture to synthesize 1-methylheptyl or 2-methylbutyl 4-hydroxy-α-methylcinnamate as shown below:

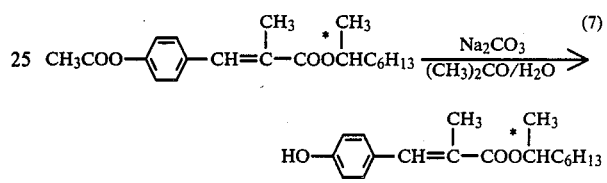

The thus obtained ester is reacted with 4-alkoxybenzoic acid chloride or 4'-alkoxybiphenyl-4-carboxylic acid chloride (the following illustration of reaction formulae will be made with reference to 4-alkoxybenzoic acid chloride as an instance) in the presence of triethylamine as shown below [the case where $R_2$ in the general formula (1) is phenylene or biphenylene]:

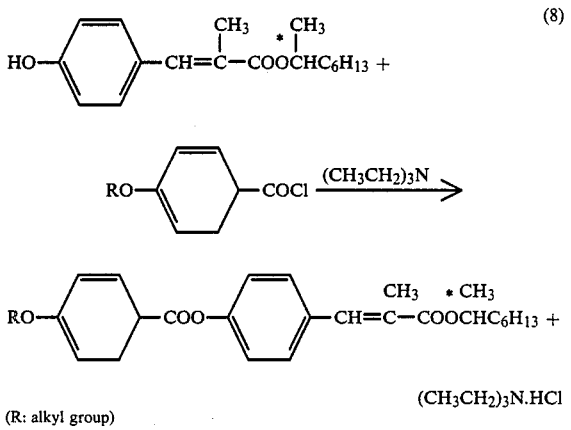

(R: alkyl group)

or the ester obtained by the reaction of the formula (7) is reacted with 4-acetoxybenzoic acid chloride to form 1-methylheptyl 4-(4'-acetoxybenzoyloxy)-α-methylcinnamate as shown below:

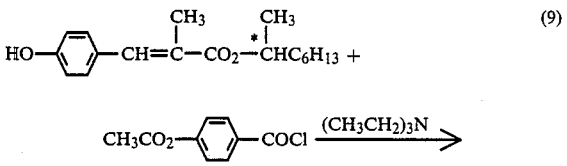

-continued

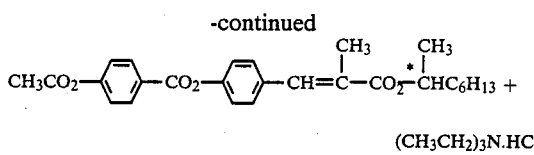

(CH₃CH₂)₃N.HCl

The thus-obtained ester is dissolved in tetrahydrofuran and an equimolar amount of a 1N aqueous solution of lithium hydroxide is added to the ester solution to effect selective hydrolysis at room temperature whereby 1-methylheptyl 4-(4'-hydroxybenzoyloxy)-α-methylcinnamate as shown below is obtained:

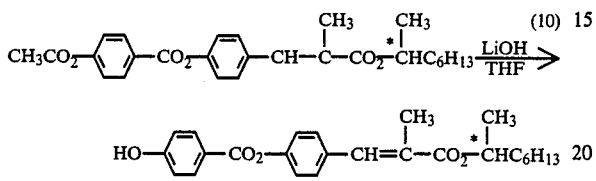
(10)

The thus-obtained ester is reacted with 4-alkoxybenzoic acid chloride in the presence of triethylamine as shown below

[the case where $R_2$ in the general formula (1) is

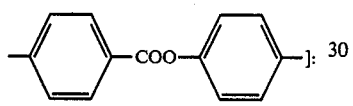]:

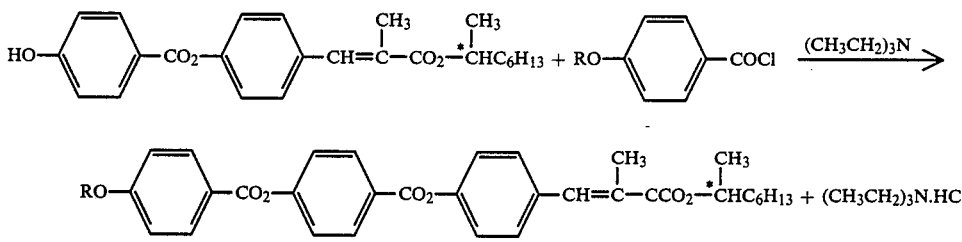
(11)

(R: alkyl group)

Furthermore, a compound of the general formula (1) in which $R_1$ is a 2-methylbutyl group is obtained by reacting 4-hydroxy-α-methylcinnamic acid obtained by the reaction of the formula (3) with 1- or d-2-methylbutanol and reacting the thus-obtained ester with 4-alkoxybenzoic acid chloride or the like. For example, this process is represented by the following formulae:

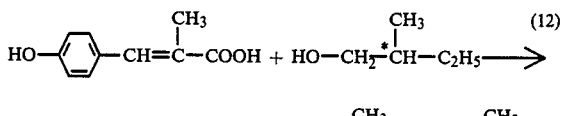
(12)

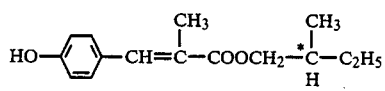

and

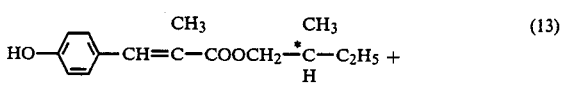
(13)

-continued

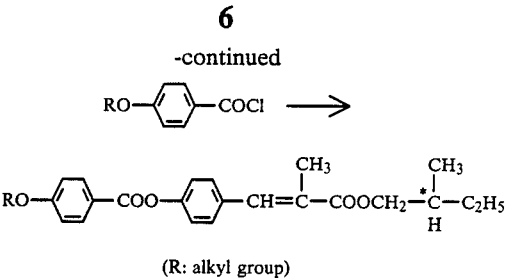

(R: alkyl group)

Since the compound of the present invention does not contain an azomethine bond inherently possessed by the conventional ferroelectric liquid crystal compounds, the chemical stability such as the hydrolysis resistance is improved in the compound of the present invention. Furthermore, since one of the hydrogen atoms of the vinyl group in the cinnamoyl moiety is substituted by a methyl group, the photostability of the compound of the present invention is improved over unsubstituted cinnamic acid type compounds. Accordingly, the compound of the present invention has excellent properties as required for a display material.

Moreover, a compound of the present invention in which the ester portion ($R_1$) is 2-methylbutyl has a large spontaneous polarization such as several $nC/cm^2$ and a compound of the present invention in which the ester portion ($R_1$) is 1-methylheptyl has a large spontaneous polarization such as scores of $nC/cm^2$. Furthermore, most of compounds of the present invention in which $R_2$ is

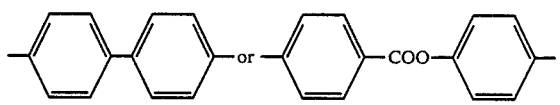

show an enantiotropic Sm*C phase within a relatively wide practical temperature range, and have an excellent thermal stability.

Although some of compounds of the present invention show ferroelectric characteristics, others do not show these ferroelectric characteristics. The compounds having ferroelectric characteristics are of course effective, and some are practically valuable because the lower limit of the temperature range showing the Sm*C phase is lower than room temperature. Moreover, compounds of the present invention having no ferroelectric characteristics are characterized in that, if mixed with other ferroelectric liquid crystals, the temperature range showing the Sm*C phase is expanded without degradation of the ferroelectric characteristics and, hence, the mixture can be used within a broad temperature range including room temperature. In addition, the spontaneous polarization of the liquid crystals is increased.

The compounds of the present invention are chemically stable because the hydrogen atom at the α-position of the cinnamic acid portion is substituted by a methyl group. Corresponding compounds in which the hydrogen atom at the α-position is substituted by a cyano group or a halogen atom have an inferior photostability, and the temperature range showing the liquid crystal phase is narrow and is present on the high temperature side. This defect is not observed in the compounds in which the hydrogen atom at the α-position is substituted by a methyl group.

Of the compounds of the present invention, those in which $R_1$ is

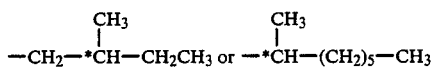

are preferred because corresponding optically active alcohols are commercially readily available at a cheap cost.

The characteristics of the liquid crystal composition of the present invention will now be described with reference to the accompanying drawings with respect to 2-methylbutyl 4-(4'-alkoxybenzoyloxy)-α-methylcinnamates as examples.

In FIG. 1, the phase transition temperatures, determined by DSC, of several esters represented by the general formula (1) are plotted against the carbon number n of the terminal alkyl $C_nH_{2n+1}$. In the drawings, Iso, Chol, SmA, Sm*C and Crystal indicate the isotropic liquid phase, the chloesteric phase, the smectic A phase, the chiral smectic C phase and the crystal phase, respectively, and -□-, I-$S_A$, |o|, $S_A$-Sc*, -▲-, M.P., -108 -, $S_A$-Chol and -Δ- represent the point of the transition from the isotropic liquid phase to the smectic A phase or chloesteric phase, the point of the transition from the smectic A phase to the chiralsmectic C phase, the point of the transition from the crystal phase to the smectic A phase, the point of the transition from the smectic A phase to the chloesteric phase, the point of the transition from the chloesteric phase to the smectic A phase and the point of the transition from the chiralsmectic C phase to the crystal phase, respectively.

As shown in FIG. 1, the Sm*C phase appears if the carbon number n of the terminal alkyl group $C_nH_{2n+1}$ is 9 or more. However, the compounds of the general formula (1) not showing the Sm*C phase are characterized in that, if mixed with other ferroelectric liquid crystals, the temperature range showing the Sm*C phase is expanded without degradation of the ferroelectric characteristics.

The liquid crystal composition of the present invention will now be described.

The liquid crystal composition of the present invention comprises a compound represented by the general formula (1). The liquid crystal composition is formed by mixing the compound of the general formula (1) with other ferroelectric liquid crystals for expanding the applicable temperature range, rather than by using the compound of the general formula (1) alone. As specific examples of the ferroelectric crystal that can be mixed with the compound of the general formula (1), there can be mentioned liquid crystals having the following molecular structures:

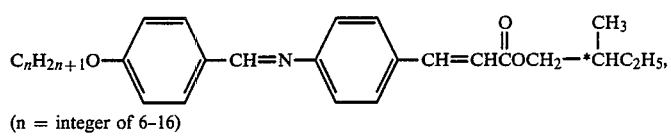

(n = integer of 6-16)

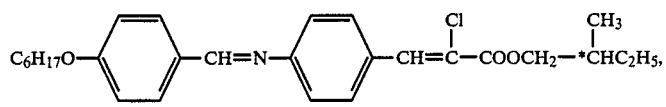

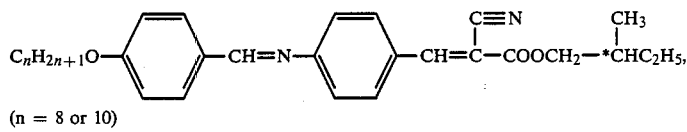

(n = 8 or 10)

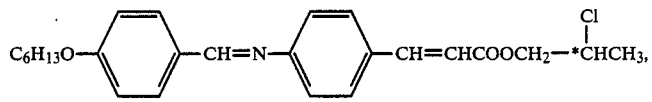

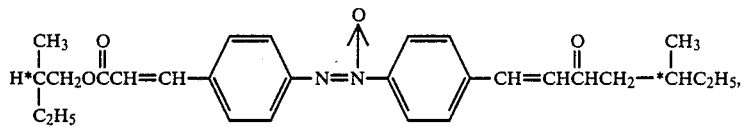

-continued
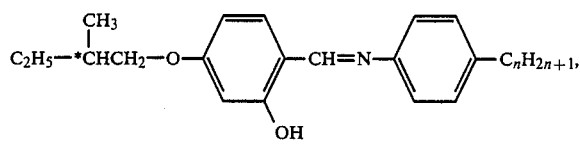
(n = integer of 7-10)
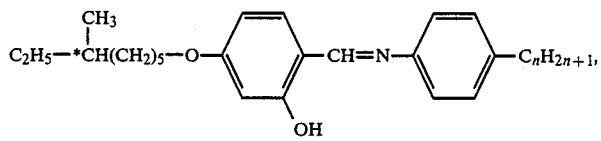
(n = integer of 7-14)
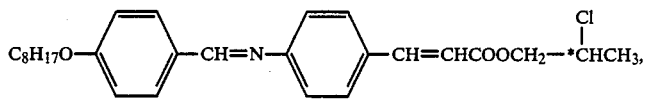
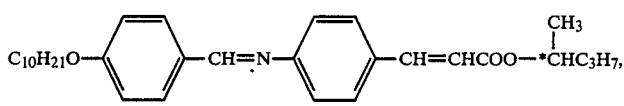
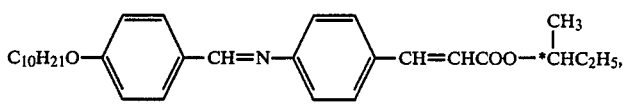
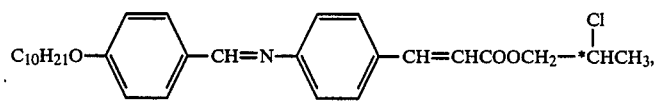
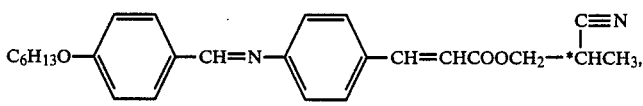
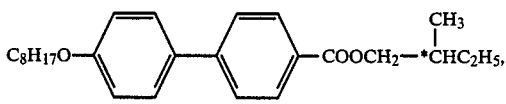
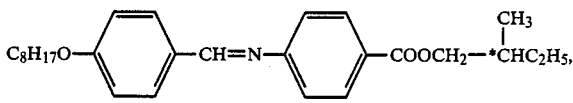
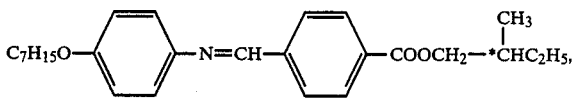
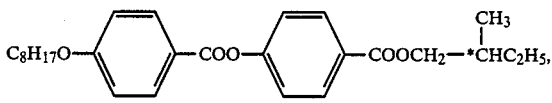
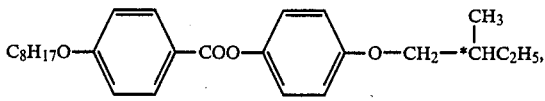
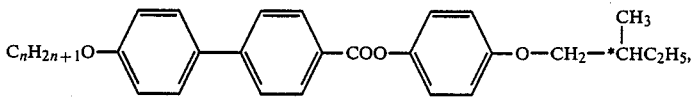

-continued (n = integer of 6-14)

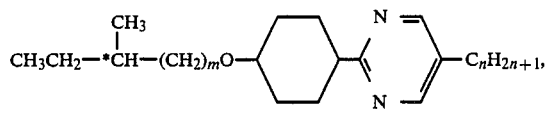

(m = 2-5, n = integer of 8-12)

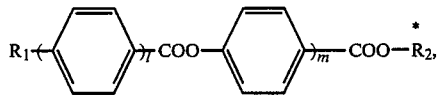

[l, m = 1-2, R$_1$ = C$_n$H$_{2n+1}$O— or C$_n$H$_{2n+1}$— (n = 8-10),

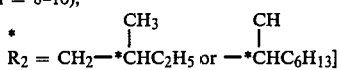

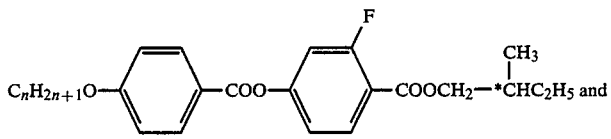

(n = 8-18)

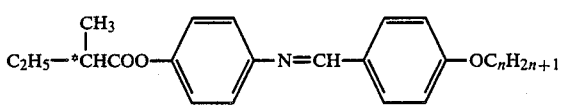

(n = 7-11)

In addition to the foregoing compounds, any compounds having the Sm*C phase can be mixed with the compound of the general formula (1). Furthermore, two or more of these liquid crystal compounds can be mixed with the compound of the general formula (1).

The liquid crystal composition of the present invention preferably contains at least 5% by weight, more preferably at least 10% by weight, of at least one compound represented by the formula (1).

The present invention will now be described in detail with reference to the following examples.

REFERENTIAL EXAMPLE 1

Synthesis of 4-hydroxy-α-methylcinnamic acid

At 135° C., 122 g of 4-hydroxybenzaldehyde, 163 g of propionic anhydride and 112 g of potassium propionate were reacted with stirring for 30 hours, the reaction mixture was dropped into 1.5 l of distilled water, and sodium carbonate was added to form an aqueous alkaline solution. The unreacted 4-hydroxybenzaldehyde was removed and concentrated hydrochloric acid was added to render the solution acidic and precipitate the reaction product. The precipitate was recovered by filtration and washed with water to obtain 85 g of a crude product. The precipitate was dissolved in a solution comprising 150 g of water, 150 g of ethanol and 30 g of sodium hydroxide, and the solution was refluxed for 2 hours and dropped into a liquid comprising concentrated hydrochloric acid and ice to precipitate the reaction product. The precipitate was recovered by filtration, washed repeatedly with distilled water and dried to obtain 61 g of crude 4-hydroxy-α-methylcinnamic acid. A product (refined 4-hydroxy-α-methylcinnamic acid) obtained by recrystallizing this crude 4-hydroxy-αmethylcinnamic acid from hot water was used for the subsequent reaction.

REFERENTIAL EXAMPLE 2

Synthesis of 1-methylheptyl 4-hydroxy-α-methylcinnamate

In 100 ml of pyridine was dissolved 18 g of refined 4-hydroxy-α-methylcinnamic acid synthesized in Referential Example 1, 20 g of acetic anhydride was dropped into the solution, and the reaction was carried out at room temperature with stirring for 2 hours. Then, the liquid reaction mixture was dropped in a 1% by weight aqueous solution of hydroxychloric acid, and the precipitated reaction product was recovered by filtration, washed with water, and dried to obtain 20 g of 4-acetoxy-α-methylcinnamic acid.

Into 20 g of this 4-acetoxy-α-methylcinnamic acid was dropped 100 g of thionyl chloride, reaction was carried out under reflux for 2 hours, unreacted thionyl chloride was removed by distillation and the reaction product was subjected to distillation under a reduced pressure to obtain 19 g of 4-acetoxy-α-methylcinnamic acid chloride. This acid chloride was dissolved in 100 ml of acetone, 11 g of l-2-octanol and 10 g of triethylamine were added to the solution, and the reaction was carried out for 10 hours under reflux. The precipitated triethylamine hydrochloride was removed by filtration, acetone was removed from the filtrate by using an evaporator, and the ether-soluble component was extracted from the residue with diethyl ether. The unreacted acid chloride was removed, and extract was dehydrated on magnesium sulfate overnight, and subsequently, diethyl ether and remaining l-2-octanol were removed by distillation under a reduced pressure. Then, 100 ml of acetone and 100 ml of an aqueous saturated solution of sodium carbonate were added to the residue and reaction was carried out under reflux for 15 hours. The obtained product was hydrolyzed and extracted with ether again. The extract was dehydrated and ether was evaporated to obtain 15 g of 1R-methylheptyl 4-hydroxy-α-methylcinnamate.

REFERENTIAL EXAMPLE 3

Synthesis of 1-methylheptyl 4-(4'-hydroxybenzoyloxy)-α-methylcinnamate

In 100 ml of diethyl ether were dissolved 15 g of 1R-methylheptyl 4-hydroxy-α-methylcinnamate and 15 g of 4-acetoxybenzoic acid chloride, and 7 g of triethylamine was gradually dropped into the solution with stirring. The mixture was heated under reflux for 10 hours after termination of the dropwise addition.

The formed triethylamine hydrochloride was removed by filtration, the residue was transferred into a separating funnel and ether was added thereto. The mixture was extracted with an aqueous saturated solution of sodium bicarbonate three times and with distilled water one time to remove the unreacted substances, and evaporation of ether gave crude 1R-methylheptyl 4-(4'-acetoxybenzoyloxy)-α-methylcinnamate.

This crude product was dissolved in 200 ml of tetrahydrofuran, 66 ml of a 1N aqueous solution of lithium hydroxide was added to the solution, and the mixture was stirred at room temperature for 4 hours. Then, the reaction mixture was extracted with ether, the solvent was evaporated by an evaporator, and separation was carried out by using a silica gel column and a benzene/n-hexane mixed solvent (1/1 volume ratio) as an eluant to obtain 10 g of 1R-methylheptyl 4-(4'-hydroxybenzoyloxy)-α-methylcinnamate.

REFERENTIAL EXAMPLE 4

Synthesis of 2-methylbutyl 4-hydroxy-α-methycinnamate

A mixture of 18 g of refined 4-hydroxy-α-methylcinnamic acid synthesized in Referential Example 1 and 70 g of 1-2-methylbutanol in 600 g of dimethylcellosolve was subjected to esterification under reflux of dimethylcellosolve and dehydration by using Soxhlet's extractor comprising a cylindrical filter paper packed with molecular sieve. The reaction was conducted for 60 hours, dimethylcellosolve was removed, and the reaction mixture was then extracted with diethyl ether to remove insoluble components, and unreacted 1-2-methylbutanol and diethyl ether were removed by distillation. The product was dissolved in 1.0 l of a solution comprising 80 parts by weight of n-pentane and 20 parts by weight of diethyl ether, the insoluble components were removed and the solvent was removed by distillation again to obtain 20 g of 2S-methylbutyl 4-hydroxy-α-methylcinnamate.

REFERENCE EXAMPLE 5

Synthesis of 4-decyloxybiphenyl-4'-carboxylic acid chloride

In 1.5 l of a 1.5N aqueous sodium hydroxide solution was dissolved 170 g of p-hydroxybiphenyl, and 254 g of dimethyl sulfate was dropped into the content while the temperature of the content was maintained at 55° C. Reaction was carried out with stirring at 70° C. for 30 minutes. The reaction product was recovered by filtration and dried under a reduced pressure. Recrystallization of the product from ethanol yielded 150 g of 4-methylbiphenyl (melting point=75°-76° C.).

In a mixed solvent of 400 ml of carbon disulfide and 600 ml of benzene was dissolved 150 g of the 4-methoxybiphenyl, 125 g of vacuum-dried aluminum chloride was added to the solution on an ice water bath and 95 g of acetyl chloride was added to the solution. The solution was refluxed for one hour and then cooled. 480 ml of an ice-cooled concentrated hydrochloric acid solution was added and, subsequently, carbon disulfide and benzene were removed by steam distillation. The product was then recovered by filtration, washed with water and then with ether, and then dried under a reduced pressure. Recrystallization of the dried product from isopropanol yielded 60 g of 4-methoxy-4'-acetoxybiphenyl.

In 400 ml of dioxane was dissolved 30 g of 4-methoxy-4'-acetoxy biphenyl. To this solution was dropped an aqueous solution composed of 84 g of sodium hydroxide, 400 ml of water and 30 ml of bromine and maintained at 40° C., and the solution was stirred for 30 minutes. Thereafter, 200 g of sodium hydrogen sulfate and 1 l of water were added to the solution, and the resultant reaction solution was concentrated under a reduced pressure, methyl bromide and dioxane were evaporated from the reaction solution, an aqueous concentrated hydrochloric acid solution was added to the solution and the solution was then allowed to stand to form a precipitate. The precipitate was recovered by filtration, washed with water and then dried to obtain 28 g of crude 4-methoxy-4'-biphenylcarboxylic acid. In 1.2 l of acetic acid was dissolved 28 g of this crude 4-methoxy-4'-biphenylcarboxylic acid. Thereafter, 240 ml of hydrogen bromide (48% concentration) was added to this solution and the mixed solution was refluxed for 10 hours. To this solution, 3 l of ice water was added, thereby forming a precipitate. The precipitate was recovered by filtration, washed with water, and then dried. The dried product was dissolved in a mixture of 50 ml of acetic anhydride and 25 ml of pyridine, and the solution was dropped in 200 ml of ice water to form a precipitate. The precipitate was recovered by filtration, washed with water and then dried. Recrystallization of the dried precipitate from acetic acid yielded 18 g of 4-acetoxy-4'-biphenylcarboxylic acid. 18 g of the 4-acetoxy-4'-biphenylcarboxylic acid was reacted with 20 g diazomethane to obtain methyl 4-acetoxy-4'-biphenylcarboxylate. The methyl 4-acetoxy-4'-biphenylcarboxylate was dissolved in 500 ml of tetrahydrofuran and an equimolar amount of a 1N aqueous lithium hydroxide solution was added to the resultant solution thereby to hydrolyze the methyl 4-acetoxy-4'-biphenylcarboxylate. The reaction mixture was extracted with ether to obtain 13 g of methyl 4-hydroxy-4'-biphenylcarboxylate.

In 100 ml of cyclohexanone were dissolved 4 g of the obtained methyl 4-hydroxy-4'-biphenylcarboxylate and 4 g of n-decyl bromide. To the solution were added 10 g of potassium carbonate and 10 g of potassium iodide, and reaction was carried out under reflux for 10 hours. The formed precipitate was removed from the reaction mixture by filtration, the filtrate was concentrated under a reduced pressure, and the separation of reactants was carried out by using a silica gel column and benzene as an eluant to obtain 2.5 g of methyl 4-n-decyloxybiphenyl-4'-carboxylate.

This ester was dissolved in 50 ml of a 10% by weight solution of sodium hydroxide in a methanol/water mixed solvent (1/1 volume ratio). The solution was refluxed for 6 hours and, subsequently, the reaction mixture was dropped in an ice-cooled aqueous hydrochloric acid solution to form a white powdery precipitate. The precipitate was recovered by filtration, washed with water and then dried to obtain 2.0 g of 4-n-decyloxybiphenyl-4'-carboxylic acid. 2.0 g of the 4-n-decyloxybiphenyl-4'-carboxylic acid was incorporated with 10 ml of thionyl chloride, and the mixture was refluxed for 2 hours. Unreacted thionyl chloride was removed under a reduced pressure to obtain 2.2 g of 4-n-decyloxybiphenyl-4'-carboxylic acid chloride.

EXAMPLE 1

Synthesis of 1-methylheptyl 4-(4'-decyloxybenzyloxy)-α-methylcinnamate

A reaction vessel was charged with 5 g of 1R-methylheptyl 4-hydroxy-α-methylcinnamate obtained in Referential Example 2, 4 g of triethylamine and 200 ml of diethyl ether, the content was cooled on an ice water bath and 6 g of 4-n-decyloxybenzoic acid chloride was gradually dropped to the content with stirring. After termination of the dropwise addition, the mixture was refluxed for 5 hours, whereby the reaction was completed.

The formed triethylamine hydrochloride was removed by filtration, diethyl ether was removed by distillation, the precipitated solid was developed by a benzene/n-hexane mixed solvent (4/6 volume ratio) in a silica gel column to isolate the intended compound, and the solvent was evaporated to obtain 5.9 g of a white opaque viscous product. From the results of the elementary analysis and infrared absorption spectrum, it was confirmed that this white opaque viscous product was 1R-methylheptyl 4-(4'-decyloxybenzoyloxy)-α-methylcinnamate.

| | Elementary Analysis Values | | |
|---|---|---|---|
| | C | H | N |
| Found values | 76.11% | 9.05% | 0.05% |
| Calculated values | 76.32% | 9.15% | 0% |

This compound was a ferroelectric liquid crystal material having the Sm*C phase. The transition temperature determined by DSC are as follows:

Cryst. I $\xrightarrow{-27.1°\ C.}$ Cryst. II $\xrightarrow{7.52°\ C.}$ Sm? $\xrightarrow{17.0°\ C.}$ SmA $\underset{33.1°\ C.}{\overset{35.1°\ C.}{\rightleftarrows}}$ Iso Sm*C $\nearrow$ 9.0° C.

Each of Cryst. I and Cryst. II indicates the crystal phase, SmA indicates the smectic A phase, Sm*C indicates the chiral smectic C phase, Sm? indicates the unknown smectic phase and Iso indicates the isotropic phase. Each arrow indicates the transition to the shown phase and the temperature given in the vicinity of the arrow indicates the temperature of the transition to the shown phase.

The obtained compound was sealed in a cell comprising two transparent electroconductive glass sheets spaced apart by a Teflon spacer having a thickness of 50 μm, and the temperature dependency of the spontaneous polarization was determined at a frequency of 0.1 Hz and a peak voltage of ±70V by using the triangular wave method reported by K. Miyasato et al [Japanese Journal of Applied Physics, 22, L661 (1983)]. The obtained results are shown by the curve "n=10" in FIG. 2. From FIG. 2, it is seen that the compound has an excellent practical utility.

When the cell was exposed outdoors in the Sm*C state for one week and the transition temperatures were measured, it was found that the transition temperature were not different from those before the exposure.

EXAMPLES 2 THROUGH 9

Synthesis of 1R-methylheptyl 4-(4'-alkoxybenzoyloxy)-α-methylcinnamates

Figure 2:
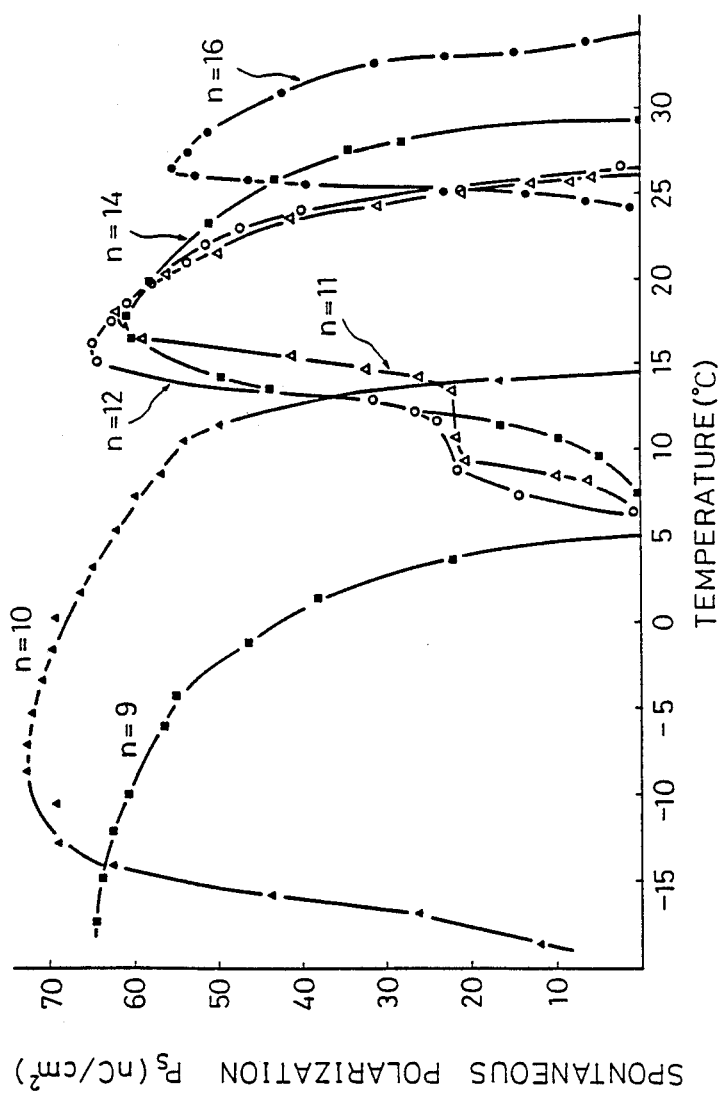
FIGS. 2, 3, 4 and 5 are diagrams illustrating the temperature dependency of the spontaneous polarization determined by the triangular wave method.

By using a 4-n-alkoxybenzoic acid chloride shown in Table 1 in an amount shown in Table 1 instead of 4-n-decyloxybenzoic acid chloride, 3 g of triethylamine, and 1.45 g of 1R-methylheptyl p-hydroxy-α-methylcinnamate, a 1R-methylheptyl 4-(4'-alkoxybenzoyloxy)-α-methylcinnamate was synthesized in the same manner as described in Example 1. Each compound was obtained in the form of a white opaque viscous product. The yields, elementary analysis values and phase transition temperatures of the obtained esters are shown in Table 1. Among these compounds, the temperature dependency of the spontaneous polarization of those which show the Sm*C phase was determined in the same manner as described in Example 1. The results are shown in FIG. 2 together with the results obtained in Example 1. In FIG. 2, "n=10", "n=11", "n=12", "n=14", "n=9" and "n=16" indicate curves of the temperature dependency of the spontaneous polarization in the compounds of Examples 1 through 4, 8 and 9, having the corresponding carbon number n in the terminal alkoxy group. From FIG. 2, it is seen that these compounds have a large spontaneous polarization in the low temperature region.

TABLE 1

| Example No. | p-Alkoxy benzoic acid chloride | | Yield | Elementary analysis value (%) | | | Phase transition temperature (°C.) |
|---|---|---|---|---|---|---|---|
| | Carbon number in alkoxy group | Amount charged (g) | (g) | C | H | N | |
| 2 | 11 | 1.55 | 2.0 | 76.42 (76.56) | 9.25 (9.28) | 0.04 (0) | 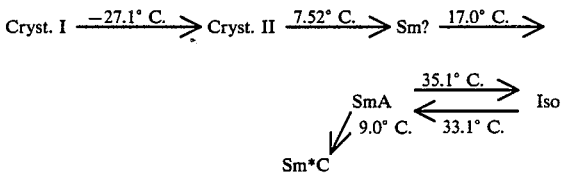 |

TABLE 1-continued

| Example No. | p-Alkoxy benzoic acid chloride Carbon number in alkoxy group | Amount charged (g) | Yield (g) | Elementary analysis value (%) C | H | N | Phase transition temperature (°C.) |
|---|---|---|---|---|---|---|---|
| 3 | 12 | 1.62 | 2.2 | 76.65 (76.78) | 9.35 (9.40) | 0.06 (0) | Cryst. $\xrightleftharpoons[s,21\ -3.2]{20.6}$ SmA $\xrightleftharpoons[34.2]{36.5}$ Iso; $-31.0\nwarrow$ $\nearrow 26$ $\leftarrow$Sm*C |
| 4 | 14 | 1.75 | 2.1 | 76.91 (76.98) | 9.41 (9.52) | 0.07 (0) | Cryst. $\xrightarrow{11.5}$ SmA $\xrightleftharpoons[26.1]{21.9}$ Iso; $-2.6\nwarrow$ $\nearrow 16.0$ Sm* |
| 5 | 6 | 1.20 | 1.9 | 75.30 (75.27) | 8.61 (8.56) | −0.10 (0.00) | Cryst. $\xrightleftharpoons[38.1]{53.0}$ Iso |
| 6 | 7 | 1.27 | 2.3 | 75.60 (76.56) | 8.69 (8,72) | −0.04 (0.00) | Cryst. $\xrightarrow{38.9}$ Iso; $23.5\nwarrow$ $\nearrow 34.5$ Sm? |
| 7 | 8 | 1.34 | 2.0 | 75.77 (75.83) | 8.91 (8.87) | −0.06 (0.00) | Cryst. $\xrightleftharpoons[1.4]{29.8}$ Chol $\xrightleftharpoons[37.8]{38.9}$ Iso |
| 8 | 9 | 1.41 | 2.2 | 75.89 (76.08) | 9.10 (9.01) | −0.05 (0.00) | Cryst. $\xrightarrow{7.3}$ SmA $\xrightleftharpoons[35.3]{37.2}$ Iso; $\nwarrow$ $\nearrow 6.0$ Sm*C |
| 9 | 16 | 1.50 | 2.4 | 77.41 (77.56) | 9.94 (9.84) | 0.09 (0) | Cryst. $\xrightleftharpoons{31}$ Sm*C $\xrightleftharpoons[34]{34}$ SmA $\xrightleftharpoons[37]{38}$ Iso; $19\nwarrow$ $\nearrow 24$ Sm? |

Note
In the column of "Elementary Analysis Values", each parenthesized value indicates the calculated value.

EXAMPLE 10

Synthesis of 1-methylheptyl 4-[4'-(4''-decyloxybenzoyloxy)benzoyloxy]-α-methylcinnamate A reaction vessel was charged with 1 g of 1R-methylheptyl 4-(4'-hydroxybenzoyloxy)-α-methylcinnamate synthesized in Referential Example 3, 1 g of triethylamine and 200 ml of diethyl ether, the content was cooled on an ice water bath and 1.2 g of 4-n-decyloxybenzoic acid chloride was gradually dropped into the olution with stirring. After termination of the dropwise addition, the mixture was heated to reflux diethyl ether for 5 hours to thereby complete the reaction.

The formed triethylamine hydrochloride was removed by filtration, the filtrate was transferred into a separating funnel, and diethyl ether was added. The mixture was extracted with an aqueous saturated solution of sodium carbonate three times and with distilled water two times and was dehydrated on anhydrous magnesium sulfate overnight. The intended product was isolated by developing the reaction mixture by a benzene/n-hexane mixed solvent (4/6 volume ratio) in a silica gel column. The solvent was evaporated and recrystallization from ether gave 1.0 g of the powder. From the elementary analysis values and infrared absorption spectrum, it was confirmed that the powder was 1R-methylheptyl 4-[4'-(4''-decyloxybenzoyloxy)-benzoyloxy]-α-methylcinnamate.

| | Elementary Analysis Values | | |
|---|---|---|---|
| | C | H | N |
| Found values | 75.28% | 8.47% | 0.10% |
| Calculated values | 75.19% | 8.11% | 0% |

The compound was a ferroelectric liquid crystal material showing the Sm*C phase, and the transition temperatures determined by DSC are as follows:

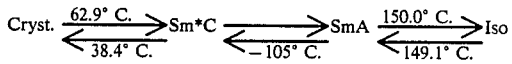

Cryst. indicates the crystal phase, SmA indicates the smectic A phase, Sm*C indicates the chiralsmectic C phase and Iso indicates the isotropic phase, and each arrow indicates the transition to the shown phase and the temperature given in the vicinity of the arrow indicates the temperature of the transition to the shown phase.

The compound was sealed in a cell comprising two transparent electroconductive glass sheets spaced apart by a Teflon spacer having a thickness of 50 μm, and the temperature dependency of the spontaneous polarization was determined at a frequency of 0.1 Hz and a peak voltage of ±70V by using the triangular wave method. The obtained results are shown by the curve "n=10" in FIG. 3. From FIG. 3, it is seen that the compound has an excellent practical utility.

When the cell was exposed outdoors in the Sm*C state for one week and the transition temperatures were measured again, it was found that the transition temperatures were not substantially different from those before the exposure.

EXAMPLES 11 THROUGH 15

Figure 3:
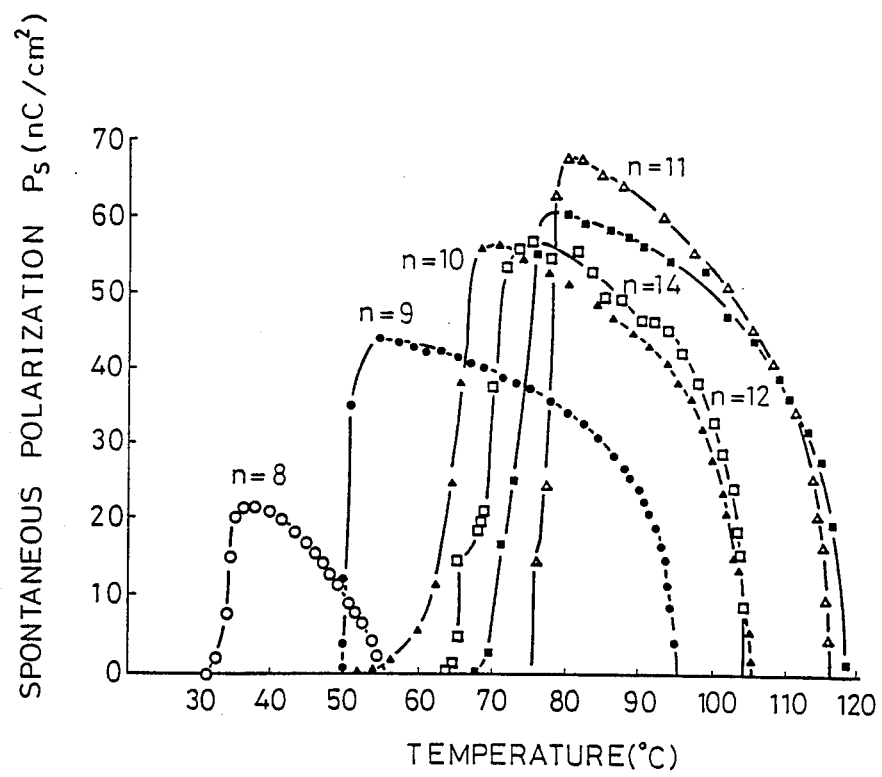

Synthesis of 1R-methylheptyl 4-[4'-(4''-alkoxybenzoyloxy)benzoyloxy]-α-methylcinnamates By using a 4-n-alkoxybenzoic acid chloride shown in Table 2 in an amount shown in Table 2 instead of 4-n-decyloxybenzoic acid chloride, 0.2 g of triethylamine and 0.48 g of 1R-methylheptyl 4-(4'-hydroxybenzoyloxy)-α-methylcinnamate, 1R-methylheptyl 4-[4'-(4''-alkoxybenzoyloxy)benzoyloxy]-α-methylcinnamate were synthesized in the same manner as in Example 10. Each ester was obtained in the form of a white crystal. The yields, elementary analysis values and phase transition temperatures of the obtained esters are shown in Table 2. The temperature dependency of the spontaneous polarization was determined in the same manner as described in Example 10. The obtained results are shown in FIG. 3 together with the results obtained in Example 10. In FIG. 3, n indicates the carbon number of the terminal alkoxy group in the compounds of Examples 11 through 15. From FIG. 3, it is seen that these compounds have a large spontaneous polarization in the low temperature region.

EXAMPLE 16

Synthesis of 2-methylbutyl 4-(4'-decyloxybenzoyloxy)-α-methylcinnamate

A reaction vessel was charged with 5 g of 2S-methylbutyl 4-hydroxy-α-methylcinnamate obtained in Referential Example 4, 4 g of triethylamine and 200 ml of diethyl ether, the content was cooled on an ice water bath and 6.2 g of 4-n-decyloxybenzoic acid chloride was gradually dropped into the content with stirring. After termination of the dropwise addition, the mixture was to refluxed for 5 hours to thereby complete the reaction.

The formed triethylamine hydrochloride was removed by filtration, diethyl ether was evaporated and the residual solid was dissolved in diethyl ether and recrystallized to obtain 6.3 g of a white powder. From the elementary analysis and infrared absorption spectrum, it was confirmed that the white powder is 2S-methylbutyl 4-(4'-decyloxybenzoyloxy)-α-methylcinnamate.

| | Elementary Analysis Values | | |
|---|---|---|---|
| | C | H | N |
| Found values | 75.55% | 8.80% | 0.08% |
| Calculated values | 75.56% | 8.72% | 0% |

This compound was a ferroelectric liquid crystal material showing the Sm*C phase, and the phase transition temperatures determined by DSC are as follows:

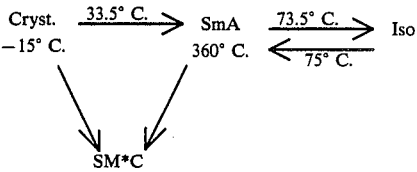

TABLE 2

| Example No. | p-Alkoxy benzoic acid chloride Carbon number in alkoxy group | Amount charged (g) | Yield (g) | Elementary analysis value (%) C | H | N | Phase transition temperature (°C.) |
|---|---|---|---|---|---|---|---|
| 11 | 8 | 0.31 | 0.3 | 74.96 (74.74) | 8.21 (7.84) | 0.03 (0.00) | Cryst. ⇌(54.8/19.0) SmA ⇌(157.2/155.2) Iso; −4.4 ↘ Sm? ←53 Sm*C |
| 12 | 9 | 0.33 | 0.3 | 74.94 (74.97) | 8.33 (7.98) | 0.26 (0.00) | Cryst. ⇌(68.7/45.6) Sm*C ⇌94 SmA ⇌(158.0/151.8) Iso |
| 13 | 11 | 0.36 | 0.3 | 75.56 (75.41) | 8.60 (8.24) | 0.05 (0.00) | Cryst. ⇌(78.5/42.6) Sm*C ⇌113.5 SmA ⇌(146.8/145.0) Iso; ↘73.0 Sm? |
| 14 | 12 | 0.39 | 0.4 | 75.81 (75.61) | 8.76 (8.36) | 0.08 (0.00) | Cryst. ⇌(61.4/38.3) Sm*C ⇌105 SmA ⇌(132.5/131.5) Iso |
| 15 | 14 | 0.41 | 0.4 | 76.14 (76.00) | 8.89 (8.60) | 0.00 (0.00) | Cryst. ⇌(60.3/48.7) Sm*C ⇌116 SmA ⇌(135.8/136.0) Iso |

Cryst. indicates the crystal phase, SmA indicates the smectic A phase, and Iso indicates the isotropic phase, the elementary analysis values and phase transition temperatures are shown in Table 3.

TABLE 3

| Example No. | p-Alkoxy benzoic acid chloride Carbon number in alkoxy group | Amount charged (g) | Yield (g) | Elementary analysis value (%) C | H | N | Phase transition temperature (°C.) |
|---|---|---|---|---|---|---|---|
| 17 | 5 | 1.13 | 0.9 | 74.10 (73.95) | 7.70 (7.81) | 0.03 (0) | Cryst. $\underset{30}{\overset{46.1}{\rightleftarrows}}$ SmA $\underset{46.7}{\overset{50.6}{\rightleftarrows}}$ Chol $\underset{58.2}{\overset{58.2}{\rightleftarrows}}$ Iso |
| 18 | 8 | 1.34 | 0.9 | 75.05 (74.97) | 8.30 (8.39) | 0.06 (0) | Cryst. $\underset{10}{\overset{37.3}{\rightleftarrows}}$ SmA $\underset{73.8}{\overset{75.0}{\rightleftarrows}}$ Iso |
| 19 | 11 | 1.55 | 1.0 | 75.91 (75.83) | 8.85 (8.87) | 0.04 (0) | Cryst. $\overset{30.1}{\rightarrow}$ SmA $\underset{73.0}{\overset{71.0}{\rightleftarrows}}$ Iso; −13.0 ↘ Sm*C ↗ 41.0 |
| 20 | 12 | 1.62 | 0.7 | 76.13 (76.08) | 9.00 (9.01) | 0.05 (0) | Cryst. $\overset{29.0}{\rightarrow}$ SmA $\underset{76.0}{\overset{74.0}{\rightleftarrows}}$ Iso; −6.5 ↘ Sm*C ↗ 44.6 |
| 21 | 14 | 1.75 | 1.1 | 76.70 (75.56) | 9.11 (9.28) | 0.08 (0) | Cryst. $\overset{40.5}{\rightarrow}$ SmA $\underset{74.0}{\overset{74.5}{\rightleftarrows}}$ Iso; 20.5 ↘ Sm*C ↗ 44.7 |
| 22 | 16 | 1.91 | 1.2 | 77.10 (76.99) | 9.50 (9.52) | 0.07 (0) | Cryst. $\overset{48.6}{\rightarrow}$ SmA $\underset{75.9}{\overset{77.3}{\rightleftarrows}}$ Iso; 35 ↘ Sm*C ↗ 50.2 |

Note
In the column of "Elementary Analysis Values", each parenthesized value indicates the calculated value.

and each arrow indicates the transition to the shown phase and the temperature given in the vicinity of the arrow indicates the temperature of the transition to the shown phase.

The compound was sealed in a transparent electro-conductive glass cell, and when the cell was exposed outdoors in the Sm*C state for one week and the transition temperatures were measured again, it was found that the transition temperatures were not different from those before the exposure.

EXAMPLES 17 THROUGH 22

Synthesis of 2S-methylbutyl 4-(4'-n-alkoxybenzoyloxy)-α-methylcinnamates

By using a 4-n-alkoxybenzoic acid chloride shown in Table 3 in an amount shown in Table 3 instead of 4-n-decyloxybenzoic acid chloride, 3 g of triethylamine and 1.24 g of 2-methylbutyl p-hydroxy-α-methylcinnamate, 2S-methylbutyl 4-(4'-n-alkoxybenzoyloxy)-α-methylcinnamates were synthesized in the same manner as in Example 16. Each ester was obtained in the form of a colorless crystal. The amount of the 4-n-alkoxybenzoic acid chloride charged, the yield of the obtained esters,

EXAMPLES 23 THROUGH 25

Synthesis of 2S-methylbutyl 4-[4'-(4''-n-alkoxybenzoyloxy)benzoyloxy]-α-methylcinnamates 2S-methylbutyl 4-hydroxybenzoyloxy-α-methylcinnamate was synthesized in the same manner as in Reference Example 3 except that 2S-methylbutyl 4-hydroxy-α-methylcinnamate was used instead of 1R-methylheptyl 4-hydroxy -α-methylcinnamate.

2S-methylbutyl 4-[4'-(4''-n-alkoxybenzoyloxy)-benzoyloxy]-α-methylcinnamates were synthesized in the same manner as in Example 10 except that 500 mg of the above-mentioned 2S-methylbutyl 4-hydroxybenzoyloxy-α-methylcinnamate was used instead of 1R-methylheptyl 4-hydroxybenzoyloxy-α-methylcinnamate, and further except that 4-n-alkoxybenzoic acid chlorides shown in Table 4 were used in amounts shown in Table 4 instead of 1.2 g of 4-n-decyloxybenzoic acid chloride. Each ester was obtained in the form of a white crystal. The amount of the 4-n-alkoxybenzoic acid chlorides charged, the yield of the obtained esters, the elementary analysis values and phase transition temperatures are shown in Table 4.

TABLE 4

| Example No. | p-Alkoxy benzoic acid chloride Carbon number in alkoxy group | Amount charged (g) | Yield (g) | Elementary analysis value (%) C | H | N | Phase transition temperature (°C.) |
|---|---|---|---|---|---|---|---|
| 23 | 9 | 0.4 | 0.50 | 74.30 (74.24) | 7.51 (7.54) | 0.01 (0) | Cryst. ⇌(97/51) SmA ⇌(171) Chol ⇌(216) Iso |
| 24 | 10 | 0.5 | 0.55 | 74.35 (74.49) | 7.64 (7.70) | 0.05 (0) | Cryst. ⇌(74/48) Sm*C ⇌(117) SmA; SmA ⇌(170) Chol ⇌(185) Iso |
| 25 | 11 | 0.5 | 0.47 | 74.63 (74.74) | 7.80 (7.84) | 0.03 (0) | Cryst. ⇌(77/50) Sm*C ⇌(130) SmA; SmA ⇌(177) Chol ⇌(182) Iso |

Note
In the column of "Elementary Analysis Values", each parenthesized value indicates the calculated value.

EXAMPLE 26

Synthesis of 2S-methylbutyl 4-oxycarbonyl-(4'-n-decyloxybiphenyl)-α-methylcinnamate

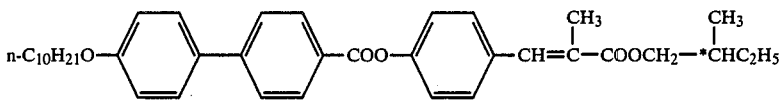

In 50 ml of diethyl ether were dissolved 500 mg of 4-decyloxybiphenyl-4'-carboxylic acid chloride synthesized in Reference Example 5 and 400 mg of 2S-methylbutyl 4-hydroxy-α-methylcinnamate, and 500 mg of triethylamine was gradually dropped in the solution with stirring at room temperature. After termination of the dropwise addition, the mixture was refluxed for 5 hours thereby to complete the reaction.

The formed triethylamine hydrochloride was removed by filtration, diethyl ether was evaporated from the filtrate and the residual product was isolated by developing the reaction mixture by a benzene/n-hexane mixed solvent (1/1 volume ratio) in a silica gel column. The solvent was evaporated and recrystallization from ether yielded 550 mg of a powder.

From the elementary analysis values and infrared absorption spectrum, it was confirmed that the powder was 2S-methylbutyl 4-oxycarbonyl-(4'-n-decyloxybiphenyl)-α-methylcinnamate.

| Elementary Analysis Values | C | H | N |
|---|---|---|---|
| Found values | 78.10% | 8.09% | 0.08% |
| Calculated values | 78.05 | 8.27% | 0% |

The compound was a ferroelectric liquid crystal material showing the Sm*C phase, and the transition temperatures determined by DSC are as follows:

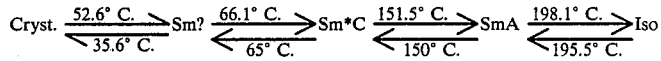

Cryst. indicates the crystal phase, Sm? indicates the unknown smectic phase, SmA indicates the smectic A phase, Sm*C indicates the chiral smectic C phase and Iso indicates the isotropic phase, and each arrow indicates the transition to the shown phase and the temperature given in the arrow indicates the temperature of the transition to the shown phase.

Figure 5:
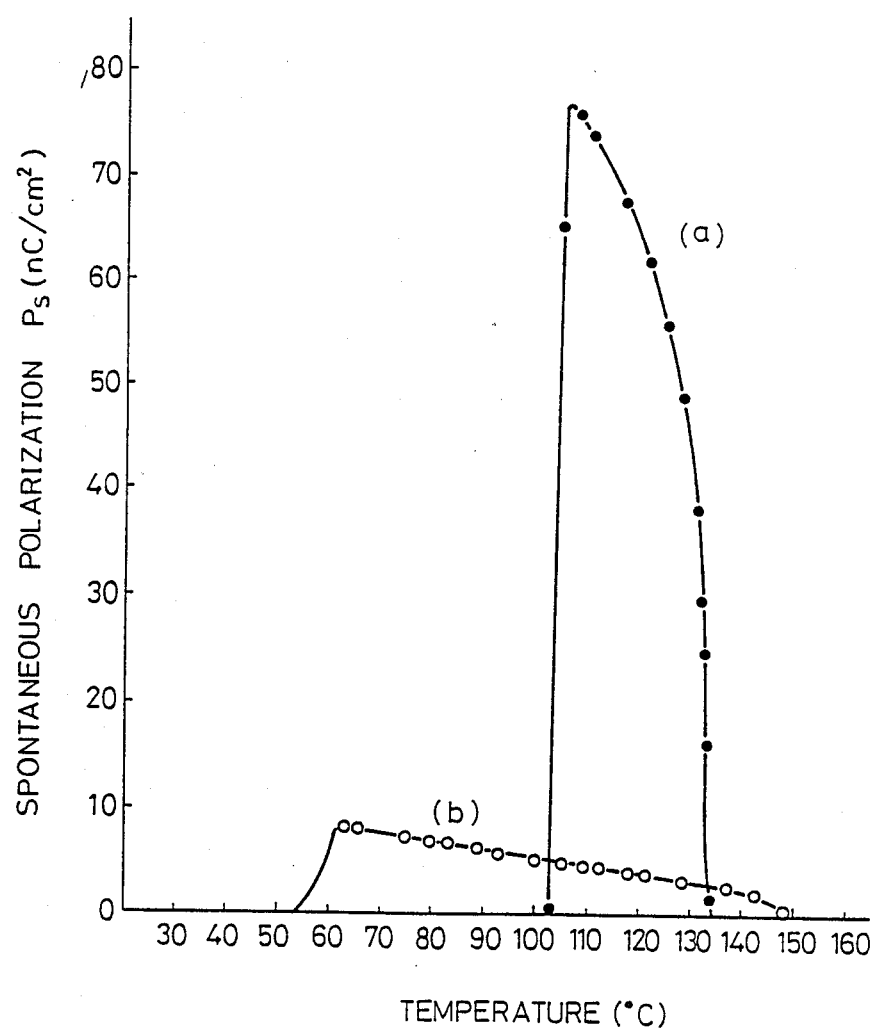

The compound was sealed in a cell comprising two transparent electroconductive glass sheets spaced from each other by a Teflon spacer having a thickness of 50 μm, and the temperature dependency of the spontaneous polarization was determined at a frequency of 0.1 Hz and a peak voltage of ±70V by using the triangular wave method. The obtained results are shown by the curve (b) in FIG. 5. The maximum spontaneous polarization was 8 nC/cm².

EXAMPLE 27

Synthesis of 1R-methylheptyl 4-oxycarbonyl-(4'n-decyloxybiphenyl)-α-methylcinnamate

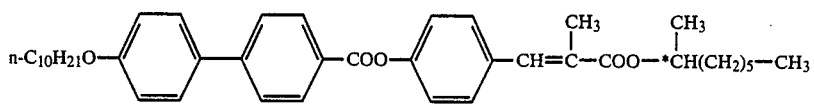

By using 500 mg of 1R-methylheptyl 4-hydroxy-α-methylcinnamate synthesized in Reference Example 2 instead of 400 mg of 2S-methylbutyl 4-hydroxy-α-methylcinnamate, 650 mg of 1R-methylheptyl 4-oxycarbonyl -(4'-n-decyloxybiphenyl)-α-methylcinnamate was synthesized in the same manner as in Example 26.

This compound was a ferroelectric liquid crystal material having the Sm*C phase. The results of the elementary analysis and the determination of the transition temperatures are as follows.

| Elementary Analysis Values | | | |
|---|---|---|---|
| | C | H | N |
| Found values | 78.49% | 8.60% | 0.05% |
| Calculated values | 78.56% | 8.68% | 0% |

$$\text{Cryst.} \underset{16.1° C.}{\overset{22.8° C.}{\rightleftarrows}} \text{Sm?} \underset{59° C.}{\overset{57.4° C.}{\rightleftarrows}} \text{Sm?} \underset{103° C.}{\overset{103° C.}{\rightleftarrows}} \text{Sm*C} \underset{131.8° C.}{\overset{133.1° C.}{\rightleftarrows}} \text{SmA} \underset{157.6° C.}{\overset{159.5° C.}{\rightleftarrows}} \text{Iso}$$

The compound was sealed in a cell comprising two transparent electroconductive glass sheets spaced from each other by a Teflon spacer having a thickness of 50 μm, and the temperature dependency of the spontaneous polarization was determined at a frequency of 0.1 Hz and a peak voltage of ±70V by using the triangular wave method. The obtained results are shown by the curve (a) in FIG. 5. The maximum spontaneous polarization was 77 nC/cm².

EXAMPLE 28

In 10 ml of ether were dissolved 0.02 g of 2S-methylbutyl 4-(4'-n-amyloxybenzoyloxy)-α-methylcinnamate synthesized in Example 17 and 0.18 g of 2S-methylbutyl 4-(4'-n-dodecyloxybenzoyloxy)-α-methylcinnamate synthesized in Example 20, and ether was evaporated to form a liquid crystal composition. The Sm*C phase-showing temperature range of the composition was from 33.4° C. to −13.7° C., namely, was expanded to the low temperature side.

COMPARATIVE EXAMPLES 1 THROUGH 4

2S-methylbutyl 4-(4'-n-butyloxybenzoyloxy)-α-methylcinnamate was synthesized under the same conditions as in Example 17 except that 1.0 g of 4-n-butyloxybenzoic acid chloride was used. This compound exhibited no liquid crystal characteristics, and the compound was fused at 71° C. and crystallized at 62° C. The phase of transitions of mixtures of this compound with compounds showing the Sm*C phase, as shown in Table 5, were examined. The Sm*C phase was not observed in any of the mixtures.

TABLE 5

| Comparative Example | Amount of 2-ethyl-butyl 4-(4'-n-butyloxybenzoyloxy)-α-methylcinnamate | Ferroelectric compound RO—⌬—COO—⌬—CH=CCOOCH₂—*CHC₂H₅ (CH₃)(CH₃) |
|---|---|---|
| 1 | 50 wt % | R = —C₁₀H₂₁, 50 wt % |
| 2 | 50 wt % | R = —C₁₂H₂₅, 50 wt % |
| 3 | 10 wt % | R = —C₁₂H₂₅, 90 wt % |
| 4 | 10 wt % | R = —C₁₁H₂₃, 90 wt % |

EXAMPLE 29

1R-methylheptyl 4-hydroxycinnamate was synthesized in the same manner as in Reference Example 2 except that 4-hydroxycinnamic acid was used instead of 4-hydroxy-α-methylcinnamic acid.

1R-methylheptyl 4-(4'-decyloxybenzoyloxy)-cinnamate was synthesized in the same manner as described in Example 1 except that the 1R-methylheptyl 4-hydroxycinnamate was used instead of 1R-methylheptyl 4-hydroxy-α-methylcinnamate.

In 20 g of diethyl ether were dissolved 300 mg of the 1R-methylheptyl 4-(4'-decyloxybenzoyloxy)-cinnamate and 700 mg of 2S-methylbutyl 4-(4'-tetradecyloxybenzoyloxy)-α-methylcinnamate synthesized in Example 21, and diethyl ether was evaporated to form a liquid crystal composition. When the temperature dependency of the spontaneous polarization of the composition was determined according to the triangular wave method, it was found that the ferroelectric temperature range was from 32° C. to 12° C. and the maximum spontaneous polarization was 15 nC/cm².

EXAMPLE 30

1R-methylheptyl 4-hydroxycinnamate was synthesized in the same manner as in Reference Example 2 except that 4-hydroxycinnamic acid was used instead of 4-hydroxy-α-methylcinnamic acid.

1R-methylheptyl 4-(4'-undecyloxybenzoyloxy)-cinnamate was synthesized in the same manner as described in Example 2 except that the 1R-methylheptyl 4-hydroxycinnamate was used instead of 1R-methylheptyl 4-hydroxy-α-methylcinnamate.

A liquid crystal composition was prepared in the same manner as described in Example 28 except that 300 mg of the 1R-methylheptyl 4-(4′-undecyloxybenzoyloxy)-cinnamate and 700 mg of 2S-methylbutyl 4-(4′-tetradecyloxybenzoyloxy)-α-methylcinnamate synthesized in Example 21 were used. When the ferroelectric temperature range of the composition was measured, it was found that the ferroelectric temperature range was from 36° C. to 11° C. and the composition showed the ferroelectric characteristics at temperatures close to room temperature. Moreover, it was confirmed that the maximum spontaneous polarization of the composition was 18 nC/cm².

EXAMPLE 31

1R-methylheptyl 4-hydroxycinnamate was synthesized in the same manner as in Reference Example 2 except that 4-hydroxycinnamic acid was used instead of 4-hydroxy-α-methylcinnamic acid.

1R-methylheptyl 4-(4′-hexadecyloxybenzoyloxy)-cinnamate was synthesized in the same manner as described in Example 5 except that the 1R-methylheptyl 4-hydroxycinnamate was used instead of 1R-methylheptyl 4-hydroxy-α-methylcinnamate.

A liquid crystal composition was prepared in the same manner as described in Example 29 except that 300 mg of the 1R-methylheptyl 4-(4′-hexadecyloxybenzoyloxy)-cinnamate and 700 mg of 2S-methylbutyl 4-(4′-tetradecyloxy)-α-methylcynnamate synthesized in Example 21 were used. When the ferroelectric temperature range of the composition was measured, it was found that the ferroelectric temperature range was from 40° C. to 14° C. and the composition was ferroelectric at temperatures close to room temperature. Furthermore, it was confirmed that the maximum spontaneous polarization was 16 nC/cm².

Figure 4:
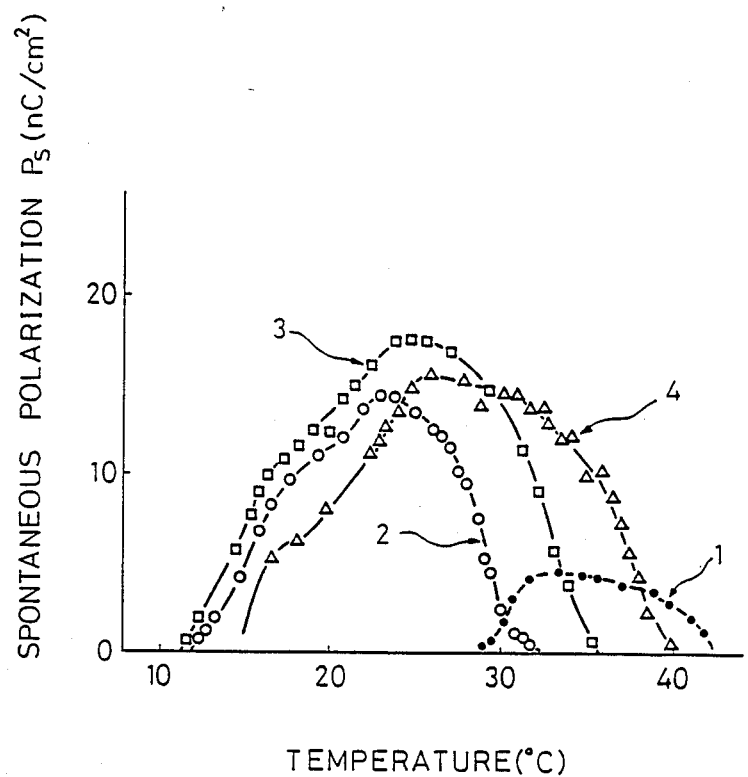

The temperature dependency of the spontaneous polarization in the compositions of Examples 29 through 31 and 2S-methylbutyl 4-(4′-tetradecyloxy)-α-methylcinnamate is shown in FIG. 4. In FIG. 4, curve 1 shows the temperature dependency of the spontaneous polarization in the compound obtained in Example 21 [2S-methylbutyl 4-(4′-tetradecyloxy)-α-methylcinnamate], and curves 2, 3 and 4 show the temperature dependencies of the spontaneous polarization of the compositions obtained in Examples 29, 30 and 31, respectively.

EXAMPLE 32

2S-methylbutyl 4-hydroxycinnamate was synthesized in the same manner as in Reference Example 4 except that 4-hydroxycinnamic acid was used instead of 4-hydroxy-α-methylcinnamic acid.

2S-methylbutyl 4-(4′-hexadecyloxybenzoyloxy)-cinnamate was synthesized in the same manner as described in Example 22 except that the 2S-methylbutyl 4-hydroxycinnamate was used instead of 2S-methylbutyl 4-hydroxy-α-methylcinnamate.

In 20 g of diethyl ether were dissolved 500 mg of 2S-methylbutyl 4-(4′-dodecyloxybenzoyloxy)-α-methylcinnamate synthesized in Example 20 and 500 mg of the 2S-methylbutyl 4-(4′-hexadecyloxybenzoyloxy)-cinnamate, and diethyl ether was evaporated to form a mixture liquid crystal composition. When the phase transition temperature of the composition was examined by using a polarization microscope and a differential scanning calorimetry (DSC), it was found that the temperature of the transition from the SmA phase to the Sm*C phase (polarization microscope) was 39.7° C. and the crystallization temperature (the temperature of exothermic crystallization peak determined at a cooling rate of 2.5° C./min by DSC) was 9.9° C. Thus, it was confirmed that the composition shows the Sm*C phase even at a temperature lower than room temperature.

REFERENTIAL EXAMPLE 6

Synthesis of 2-methylbutyl 4-(4′-dodecyloxybenzoyloxy)-α-cyanocinnamate

The above-mentioned compound was synthesized in the same manner as described in Referential Example 4 and Example 20 except that α-cyano-p-hydroxycinnamic acid was used instead of α-methyl-p-hydroxycinnamic acid.

The identification was effected by elementary analysis values, infrared absorption spectrum and proton NMR spectrum. The elementary analysis values and the Sm*C phase-showing temperature range are shown below.

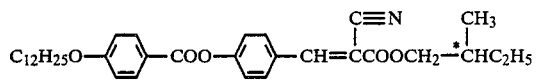

| | Elementary Analysis Values | | |
|---|---|---|---|
| | C | H | N |
| Found values | 74.34% | 8.57% | 2.49% |
| Calculated values | 74.55% | 8.28% | 2.56% |

EXAMPLE 33

A liquid crystal composition was prepared in the same manner as described in Example 32 except that 500 mg of 2S-methylbutyl 4-(4′-dodecyloxybenzoyloxy)-α-methylcinnamate synthesized in Example 20 and 500 mg of 2-methylbutyl 4-(4′-dodecyloxybenzoyloxy)-α-cyanocinnamate synthesized in Referential Example 6 were used. When the Sm*C phase-showing temperature of the composition was examined, it was found that this temperature range was from 16.6° C. to 56.3° C. Thus, it was confirmed that the composition shows the Sm*C phase at temperatures close to room temperature.

EXAMPLE 34

A liquid crystal composition was prepared in the same manner as described in Example 32 except that 500 mg of 2S-methylbutyl 4-(4′-dodecyloxybenzoyloxy)-α-methylcinnamate and 500 mg of commercially available p-decyloxybenzylidene-p′-amino-2-methylbutyl cinnamate (DOBAMBC) were used. When the Sm*C phase-showing temperature range was measured, it was found that this temperature range was from 6.5° C. to 64.5° C. Thus, it was confirmed that the composition shows the Sm*C phase at temperature close to room temperature.

EXAMPLE 35

A liquid crystal composition was prepared in the same manner as described in Example 32 except that 300 mg of 2S-methylbutyl 4-(4′-dodecyloxybenzoyloxy)-α-methylcinnamate synthesized in Example 20, 300 mg of 2S-methylbutyl 4-(4′-hexadecyloxybenzoyloxy)-cinnamate used in Example 32 and 300 mg of 2-methylbutyl 4-(4'-dodecyloxybenzoyloxy)-α-cyanocinnamate were used. When the Sm*C phase-showing temperature range of the mixture was measured, it was found that this temperature range was from −0.1° C. to 50.9° C. Thus, it was confirmed that the composition shows the Sm*C phase at temperatures close to room temperature.

EXAMPLE 36

A liquid crystal composition was prepared in the same manner as described in Example 32 except that 300 mg of 2S-methylbutyl 4-(4'-dodecyloxybenzoyloxy)-α-methylcinnamate synthesized in Example 20, 300 mg of 2S-methylbutyl 4-(4'-hexadecyloxybenzoyloxy)-cinnamate used in Example 32 and 300 mg of DOBAMBC used in Example 34 were used. When the Sm*C phase-showing temperature of the mixture was measured, it was found that this temperature range was from −7.2° C. to 55.2° C. Thus, it was confirmed that the composition shows the Sm*C phase over a broad temperature range in the vicinity of room temperature.

EXAMPLE 37

2S-methylbutyl 4-hydroxycinnamate was synthesized in the same manner as in Reference Example 4 except that 4-hydroxycinnamic acid was used instead of 4-hydroxy-α-methylcinnamic acid.

2S-methylbutyl 4-(4'-nonyloxybenzoyloxy)-α-methylcinnamate was synthesized in the same manner as described in Example 16 except that 4-n-nonyloxybenzoic acid chloride was used instead of 4-n-decyloxybenzoic acid chloride.

2S-methylbutyl 4-(4'-undecyloxybenzoyloxy)-cinnamate was synthesized in the same manner as in Example 19 except that the 2S-methylbutyl 4-hydroxycinnamate was used instead of 2S-methylbutyl 4-hydroxy-2-methylcinnamate.

A liquid crystal composition was prepared in the same manner as described in Example 32 except that 200 mg of the 2S-methylbutyl 4-(4'-nonyloxybenzoyloxy)-α-methylcinnamate, 200 mg of the 2S -methylbutyl 4-(4'-undecyloxybenzoyloxy)-cinnamate, 200 mg of 2-methylbutyl 4-(4'-dodecyloxybenzoyloxy)-α-cyanocinnamate synthesized in Referential Example 6 and 200 mg of commercially available DOBAMBC used in Example 34 were used. When the Sm*C phase-showing temperature range was measured, it was found that this temperature ranges was from −23.7° C. to 43.5° C. Thus, it was confirmed that the composition shows the Sm*C phase even at considerably low temperatures over a broad temperature range with room temperature as the center thereof.

Compounds not disclosed in the foregoing examples, for instance, compounds in which $R_1$ is a 1-methylheptyl group, $R_2$ is a phenylene group and n is 5, 13, 15, 17 or 18, can be synthesized in the same manner as in Example 1. These compounds have the Sm*C phase-showing temperature range substantially the same as that of the compounds of Examples 1 through 4 or Example 8 or 9, or, if these compounds are mixed with other ferroelectric liquid crystals, the Sm*C phase-showing temperature of the liquid crystals will be expanded without degradation of the ferroelectric characteristics.

Compounds in which $R_1$ is a 1-methylheptyl group, $R_2$ is

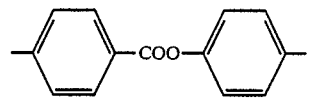

and n is 5, 6, 7, 13, 15, 16, 17 or 18 can be synthesized in the same manner as in Example 10, and they are believed to be as valuable as the compounds of Examples 10 through 15 because the spontaneous polarization will be large and the applicable temperature range will be broad when they are used singly or in combination with other ferroelectric liquid crystals.

Furthermore, compounds in which $R_1$ is a 1-methylhexyl or 2-methylbutyl group, $R_2$ is

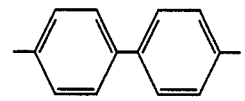

and n is 5 through 18, other than the compounds of Examples 26 and 27, can be synthesized in the same manner as described in Examples 26 and 27, and the characteristics of these compounds will be substantially the same as those of the compounds of Examples 26 and 27. Compounds in which $R_1$ is a 2-methylbutyl group, $R_2$ is a phenylene group and n i 13, 15, 17 or 18 or $R_2$ is

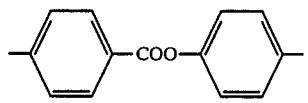

and n is 5 through 18, other than the compounds of Examples 23, 24 and 25, can be synthesized in the same manner as described in Examples 23, 24 and 25, and these compounds will have characteristics similar to those of the compounds of Examples 23, 24 and 25 and have a similar utility.

In the compounds of the present invention, the structure

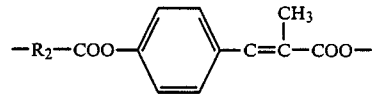

giving a broad π-electron distribution and the optically active group present in the vicinity of this structure are factors important for exhibition of the smectic phase, and it is sufficient if the carbon number of the alkoxy group connected to —$R_2$— and the carbon number of the alkyl group bonded to the asymmetric carbon atom are within ranges stabilizing the smectic phase. Accordingly, it is obvious that in the compounds in which $R_1$ is

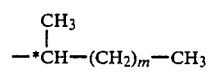

and m is 1 through 4 or $R_1$ is

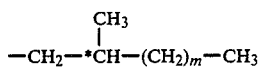

and m is 2 through 5, similar good performances will be exhibited. If m is further increased, similar performances will be exhibited, but the industrial significance will be reduced.

As pointed out hereinbefore, the compound of the present invention is very valuable for a ferroelectric liquid crystal, and is characterized in that the compound has a large spontaneous polarization and excellent chemical stability and does not undergo undesirable coloration, and if the compound shows the Sm*C phase, since the Sm*C phase appears in the practical temperature range, a liquid crystal composition capable of displaying in a broad temperature region including room temperature can be provided.

Furthermore, in the case of the compound which does not show the Sm*C phase, if the compound is mixed with other ferroelectric liquid crystal compounds, the Sm*C phase-showing temperature region of the compounds is expanded and the spontaneous polarization is increased.

Moreover, the liquid crystal composition of the present invention is characterized in that the Sm*C phase-showing temperature range can be expanded to a level below room temperature, though this is not attainable in the conventional ferroelectric liquid crystal compositions, while the characteristic properties of the conventional ferroelectric liquid crystal compositions are retained. Accordingly, the liquid crystal composition of the present invention is a ferroelectric liquid crystal composition suitable for a display device. Moreover, the liquid crystal composition of the present invention has a large spontaneous polarization such as several nC/cm² to scores of nC/cm², and the liquid crystal composition has a sufficient response speed that it can be applied to not only a display device but also to a high-speed printer head.

We claim:

1. An α-methylcinnamic acid ester derivative represented by the following general formula (1):

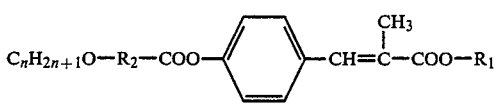

wherein n is an integer of from 5 to 18, $R_1$ represents an optically active group of the formula

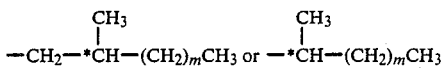

in which m is an integer of from 1 to 5 and *C represents an asymmetric carbon atom, and $R_2$ represents

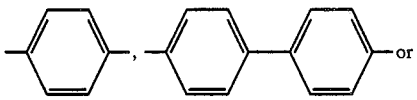

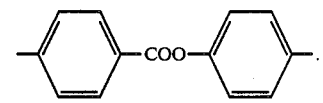

2. An α-methylcinnamic acid ester derivative according to claim 1, wherein $R_1$ is

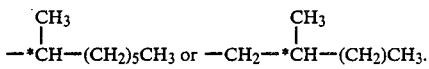

3. A liquid crystal composition comprising an α-methylcinnamic acid ester derivative represented by the following general formula (1):

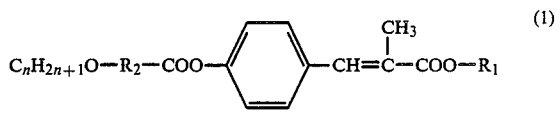

wherein n is an integer of from 5 to 18, $R_1$ represents an optically active group of the formula

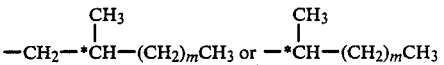

in which m is an integer of from 1 to 5 and *C represents an asymmetric carbon atom, and $R_2$ represents

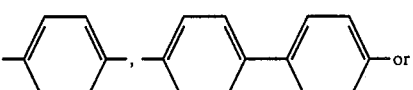

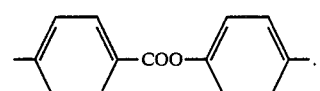

* * * * *